(12) United States Patent
Govindan et al.

(10) Patent No.: US 11,551,695 B1
(45) Date of Patent: Jan. 10, 2023

(54) MODEL TRAINING SYSTEM FOR CUSTOM SPEECH-TO-TEXT MODELS

(71) Applicant: Amazon Technologies, Inc., Seattle, WA (US)

(72) Inventors: Vivek Govindan, Redmond, WA (US); Varun Sembium Varadarajan, Bothell, WA (US); Christian Egon Berkhoff Dossow, Lake Forest Park, WA (US); Himalay Mohanlal Joriwal, Seattle, WA (US); Sai Madhuri Bhavirisetty, Bellevue, WA (US); Abhinav Kumar, Bellevue, WA (US); Orestis Lykouropoulos, Seattle, WA (US); Akshay Nalwaya, Seattle, WA (US); Rahul Gupta, Seattle, WA (US); Sravan Babu Bodapati, Redmond, WA (US); Liangwei Guo, Seattle, WA (US); Julian E. S. Salazar, San Francisco, CA (US); Yibin Wang, Seattle, WA (US); K P N V D S Siva Rama, Seattle, WA (US); Calvin Xuan Li, Seattle, WA (US); Mohit Narendra Gupta, Seattle, WA (US); Asem Rustum, Sammamish, WA (US); Katrin Kirchhoff, Seattle, WA (US); Pu Zhao, Lynnwood, WA (US)

(73) Assignee: Amazon Technologies, Inc., Seattle, WA (US)

(*) Notice: Subject to any disclaimer, the term of this patent is extended or adjusted under 35 U.S.C. 154(b) by 149 days.

(21) Appl. No.: 15/931,455

(22) Filed: May 13, 2020

(51) Int. Cl.
*G10L 15/26* (2006.01)
*G10L 15/07* (2013.01)
*G10L 15/06* (2013.01)

(52) U.S. Cl.
CPC ............ *G10L 15/26* (2013.01); *G10L 15/063* (2013.01); *G10L 15/07* (2013.01); *G10L 2015/0638* (2013.01)

(58) Field of Classification Search
CPC ....... G10L 15/26; G10L 15/063; G10L 15/07; G10L 2015/0638; G10L 15/005;
(Continued)

(56) References Cited

U.S. PATENT DOCUMENTS

| 5,758,023 | A | * | 5/1998 | Bordeaux | ............... G10L 15/18 704/235 |
| 7,308,404 | B2 | * | 12/2007 | Venkataraman | ...... G10L 15/183 704/E15.009 |

(Continued)

*Primary Examiner* — Linda Wong
(74) *Attorney, Agent, or Firm* — Robert C. Kowert; Kowert, Hood, Muynon, Rankin & Goetzel, P.C.

(57) ABSTRACT

A transcription service may receive a request from a developer to build a custom speech-to-text model for a specific domain of speech. The custom speech-to-text model for the specific domain may replace a general speech-to-text model or add to a set of one or more speech-to-text models available for transcribing speech. The transcription service may receive a training data and instructions representing tasks. The transcription service may determine respective schedules for executing the instructions based at least in part on dependencies between the tasks. The transcription service may execute the instructions according to the respective schedules to train a speech-to-text model for a specific domain using the training data set. The transcription service may deploy the trained speech-to-text model as part of a network-accessible service for an end user to convert audio in the specific domain into texts.

20 Claims, 7 Drawing Sheets

(58) Field of Classification Search
CPC ......... G10L 15/16; G10L 15/06; G10L 25/30; G10L 15/00; G10L 15/18; G06F 40/47; G06F 40/58; G06F 40/42; G06N 20/00; G06N 3/08; G06N 3/02
See application file for complete search history.

(56) References Cited

U.S. PATENT DOCUMENTS

| | | | |
|---|---|---|---|
| 9,292,487 B1* | 3/2016 | Weber | G10L 15/063 |
| 10,747,962 B1* | 8/2020 | Fuerstenau | G06N 3/0454 |
| 2002/0087315 A1* | 7/2002 | Lee | G10L 15/197 |
| | | | 704/E15.044 |
| 2017/0358297 A1* | 12/2017 | Scheiner | G10L 15/30 |
| 2021/0064828 A1* | 3/2021 | Johnson Premkumar | |
| | | | G06F 40/51 |

* cited by examiner

MODEL TRAINING SYSTEM FOR CUSTOM SPEECH-TO-TEXT MODELS

BACKGROUND

Speech recognition services allow end users to submit audio and receive a text transcription. However, existing speech recognition services mostly rely on general-purpose speech-to-text models to transcribe the spoken language into texts. In reality, the end users may require transcriptions for speech in different domains, e.g., legal, finance, etc. The one-size-fits-all approach used by general-purpose speech-to-text models cannot guarantee the required transcription performance and accuracy. Thus, it is desirable to have tools enabling developers to build custom speech-to-text models for specific domains.

Figure 1:
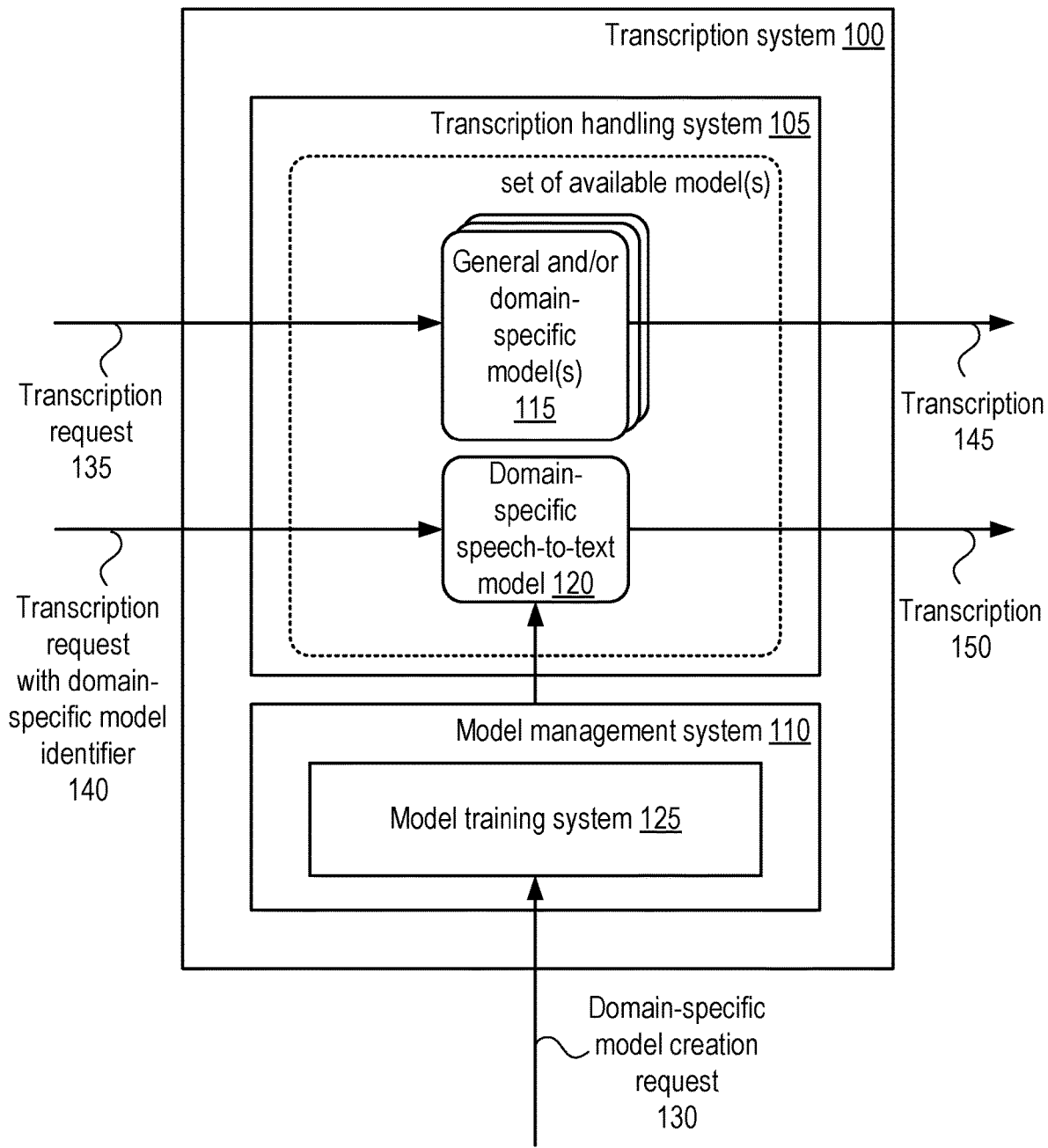
FIG. 1 is a block diagram showing an example transcription system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for creating and applying a speech-to-text model for a specific domain of speech are described herein. For example, a transcription service may allow developers to build custom speech-to-text models for specific domains of speech, in some embodiments. In some embodiments, the custom speech-to-text model for the specific domain may replace a general speech-to-text model or add to a set of one or more speech-to-text models available for transcribing speech in a same language (e.g., a legal speech domain in German instead of general German speech). In some embodiments, the transcription service may be implemented as part of a provider network based on one or more computing devices each of which may include processor(s) and memory. The provider network may provide the transcription service as a network-accessible service. For instance, the provider network may be a cloud service network, and clients (or subscribers) of services of the provider network may access the transcription service through various network connections. In some embodiments, besides the transcription service, the provider network may offer various other network-accessible services such as remote computing, database, storage, networking, e-mail, etc.

In some embodiments, the creation and training of domain-specific models for a transcription service may be performed by a training system implemented as part of the transcription service or a training service implemented separately from the transcription service. In either case, a training system or service may interact primarily with developers to build custom speech-to-text models for specific domains and the transcription service may interact primarily with end users who utilize custom speech-to-text models generated by the training system or service for audio transcription. In some embodiments, the training system or service may include a model development frontend, a personalization database, training task execution resources, artifact repository, and/or coordinator. The model development frontend may include one or more programmatic interfaces, e.g., a user console, a graphic user interface (GUI), an HTTP/HTTPS endpoint, a command line interface (CLI), etc. which may receive a request from a developer. The developer may submit the request with training data and associated metadata for creating a custom speech-to-text model for a specific domain.

For instance, the developer may utilize the training system or service to build the speech-to-text model for end users in the legal industry, financial industry, etc. In some embodiments, the developer may include in the request a workflow, e.g., written in a DSL (Domain Specific Language), and instructions for tasks. For instance, the instructions for the tasks may include code contained in respective task images (e.g., container images which may be an application to be executed on a virtualized operating system (as opposed to a virtual machine)), and the workflow may be a Python code representing a sequence for performing tasks to build the custom speech-to-text model. In some embodiments, the sequence may rest on the dependencies between tasks, e.g., dependencies between individual input and output of tasks. For instance, when the output of a first task become the input of a second task, the first task may have to be performed before the performance of the second task.

In some embodiments, when the model development frontend receives the request from the developer, the model development frontend may parse the request and store the uploaded data to the personalization database for this developer. For instance, the training data may be stored in a training data section while associated metadata may be saved to the metadata section of the personalization database. In some embodiments, the developer may configure various settings of his/her personalization database. For instance, the developer may decide who has what type of access to what type of data stored in the personalization database, e.g., for security purposes. Herein, the access may include operations such as to read, write, delete and/or update the corresponding data. In another example, the developer may decide how long the data may be stored in the personalization database. When the time expires, the corresponding data may be removed from the personalization database.

In some embodiments, in response to the request from the developer, the model development frontend may parse the workflow to determine respective schedules for executing the instructions of the tasks. For instance, the model development frontend may generate a dependency graph representing the dependencies between the tasks and schedule executions of the corresponding instructions accordingly. In some embodiments, a training system or service may include a coordinator to orchestrate the custom speech-to-text model generation and training process. For example, the model development frontend may inform a coordinator of the request from the developer for creating the custom speech-to-text model. In some embodiments, the coordinator may access the personalization database and send the instructions and/or training data to training task execution resources of the training service according to respective schedules. The training task execution resources may execute the instructions to perform the tasks using the training data to generate and train the custom speech-to-text model for the specific domain.

For instance, when the instructions are contained in task images, respective containers (or other execution resources) based on the image may be instantiated with training task execution resources to run the contained code on a virtualized operating system to perform the respective tasks. In some embodiments, the coordinator may pull the instructions and/or training data from the personalization database in a batch model. Moreover, in some embodiments, the coordinator may automatically determine the scale of the custom speech-to-text model building job based at least in part on, e.g., the volume of the training data and/or the number of tasks to be processed, and submit the batch data to training task execution resources accordingly to scale out the tasks. For instance, the coordinator may refer to the workflow or dependency graph, determine one batch of tasks, and pull the corresponding instructions and/or training data from the personalization database to provide to training task execution resources to perform the corresponding batch of tasks. After receiving an indication that this batch of tasks has been performed, the coordinator may determine a next batch of tasks with reference to the schedules, pull a next batch of instructions and/or training data for the training system to perform the next batch of tasks.

In some embodiments, a transcription service may include a speech-to-text model repository. The developer may not necessarily submit a model to the transcription service. Instead, the developer may specify a model from the repository, as a template, to generate and train the custom speech-to-text model (e.g., which can invoke a creation and training job performed by a separate training service or an internal creation and training system). In some embodiments, the developer may submit a primitive (e.g., untrained) speech-to-text model to the transcription service, e.g., through the model development frontend of a training system or service that provides domain-specific models for application by the transcription service. A training system (e.g., either a separate service or an internal training system) may train the primitive model to generate the custom speech-to-text model.

In some embodiments, the instructions for tasks may include various parameters and resource requirements for the corresponding task. The developer may not necessarily specify what resources are to be used for building the custom speech-to-text model, in some embodiments. Instead, the training system or service may identify, reserve and configure the appropriate computing resources. The training system or service may then utilize the provisioned computing resources to execute the instructions to generate and train the custom speech-to-text model. The training system or service may continuously monitor the performance of the tasks and adjust the computing resource status accordingly. For instance, when more computing resources are needed, the training system or service may add more resources, whilst when fewer computing resources are required, the transcription service may release unneeded resources. This way, the developer may only pay for necessary resources without overpaying for resources that never get used.

In some embodiments, the training system or service may provide the transcription service with various training-related data to an artifact repository (which may be accessible to or implemented within a transcription service). For instance, the artifact repository may store various versions of the custom speech-to-text model. In another example, the artifact repository may maintain various events or logs associated with training of the custom speech-to-text model. For instance, the various events or logs may include time series of training error(s) for different training parameters, training data, etc. In some embodiments, the transcription service may assign unique identifiers for the various speech-to-text models and training-related data stored in the artifact repository, based on which end users may access these data in a future, as described below. Similarly, the developer may configure various settings as to the data stored in the artifact repository, e.g., for security reasons. For instance, the developer may decide who has what type of access to what type of data stored in the artifact repository. The access may include operations such as to read, write, delete and/or update the corresponding data.

Once the training of the custom speech-to-text model is completed, the developer may request the transcription service to deploy the trained model for testing. In some embodiments, the transcription service may automatically determine and provision appropriate computing resources for to host the deployed custom speech-to-text model. In another example, the developer may specify the needed computing resources and request the transcription service to reserve and provision the computing resources accordingly. In some embodiments, the developer may deploy the custom speech-to-text model by incorporating it in various applications, e.g., through an application programmatic interface (API) in a dialog-driven application. In some embodiments, the custom model may be identified based at least in part on the identifier assigned to the model by the transcription service, as described above. When an end user uses the applications, an API call may be invoked to submit audio data in a specific domain (e.g., data in various audio and/or video files) to the transcription service. The transcription service may apply the audio data to the custom speech-to-text model to transcribe the audio data and return the text transcription. In some embodiments, the custom speech-to-text model may be deployed as part of a network-accessible service. The end user may submit audio data directly to the transcription service, e.g., through end user programmatic interface (e.g., a user console, a graphic user interface (GUI), an HTTP/HTTPS endpoint, a command line interface (CLI), etc.). The end user may identify the custom speech-to-text model based at least in part on an identifier associated with the custom model. The audio data may be applied to the speech-to-text model to generate the converted transcription for the end user. In some embodiments, the transcription service may further include an end user records repository which may store various data associated with individual end users. For instance, the end user records repository may maintain the audio data and/or associated transcriptions for the specific end user. The end user may also specify the settings for his/her data stored in the end user records repository to configure the security and access privileges for the corresponding data.

In some embodiments, end users may also include the developer him/herself or other end users who may want to access the custom speech-to-text model and/or associated training-related data, e.g., stored in the artifact repository, after training of the custom model. For instance, a developer may want to access the trained model and perform some further training or improvement. In another example, the developer may want to re-use the custom speech-to-text model, as a template, to develop other custom models. In another example, the developer may want to view the training process to analyze selections of parameters and other training-related information for debugging purposes. In some embodiments, the events or logs stored in the artifact repository may be used to create displays for the end user. For instance, the end user may retrieve the training-related information to plot curves to demonstrate a previous training process of the custom speech-to-text model, etc.

One skilled in the art will appreciate that the techniques disclosed herein are capable of providing toolkits to enable developers to streamline the development of custom speech-to-text models for specific domains. As the toolkits are offered as a network-accessible service of a provider network, this greatly reduces the resource requirements upon developers. The developers only submit tasks in modules (e.g., in task images), and the transcription service can automatically provision the computing resources, scale out the training tasks, and perform training of the custom speech-to-text models for the developers. Because the custom speech-to-text models are designed to fit specific domains, this can improve the speech recognition performance and accuracy. Further, the trained custom speech-to-text models can also be deployed as a network-accessible service for the end users.

In some embodiments, the transcription service may implement various privacy or other permissions-based controls for performing feature extraction or other audio data analysis as part of the implemented speech-to-text techniques. Extraction of some (or all) features may, for instance, be restricted from the data audio without first determining that a speaker's permission (e.g., a user opt-in) has been granted. In this way, the transcription service may allow for a speaker to control the types of analysis that are performed. For example, received audio files may be marked, flagged, or otherwise indicate permissions for the kinds of analysis to be performed. In this way, client applications that rely upon the transcription service can specify the types of analyses that are (or are not) to be performed, in some embodiments. Moreover, such applications can provide a guarantee to speakers of the types of analysis that will (or will) not be performed.

FIG. 1 shows an example transcription system, according to some embodiments. As shown in this example in FIG. 1, transcription system 100 may include transcription handling system 105 and/or model management system 110. In some embodiments, transcription handling system 105 may store a set of available models, e.g., available general speech-to-text model(s) and/or speech-to-text model(s) for specific domain(s) of speech in one or more languages 115. For instance, models 115 may include a general speech-to-text model in English, a speech-to-text model for the medical domain in English, a general speech-to-text model in Arabic, and a speech-to-text model for the medical domain in German. In some embodiments, transcription system 100 may receive transcription request 135 for transcribing audio data (e.g., from various audio and/or video files), e.g., from an end user of the transcription service. For instance, transcription request 135 may request transcription system 100 to transcribe an audio file to texts in English. In response, transcription handling system 105 may apply the set of available model(s) to the audio file to generate the corresponding texts 145. However, the set of available model(s) of transcription system 100 may not necessarily include the speech-to-text models for all specific domain of speech. Therefore, in some embodiments, transcription system 100 may receive domain-specific model creation request 130, e.g., from a developer of transcription system 100, to create a custom speech-to-text model 120 for the specific domain of speech to replace the general speech-to-text model 115 in the same language or add to the available model(s) 115. For instance, domain-specific model creation request 130 may request to create custom speech-to-text model 120 for legal domain in English to be added to the set of available models 115. In some embodiments, transcription system 100 may include model management system 110 for implementing the generation and training of domain-specific speech-to-text model 120. For instance, model management system 110 may use model training system 125 to create and train domain-specific speech-to-text model 120. In some embodiments, model management system 110 may assign a unique identifier to the trained domain-specific speech-to-text model 120 and add it to the set of available model(s). Once created, custom speech-to-text model 120 may be used to replace existing general speech-to-text model 115 in the same language for transcription of audio data associated specifically with the legal context. For instance, transcription system 100 may use a trained English-version custom speech-to-text model 120 to replace general speech-to-text model 115 in English to transcribe audio in English associated with the legal domain. In some embodiments, transcription system 100 may receive transcription request 140 for transcribing, where transcription 140 may specify domain-specific speech-to-text model 120 with the identifier assigned to domain-specific speech-to-text model 120. In response, transcription system 100 may use the identifier to select domain-specific speech-to-text model 120 from the available set of models and generate corresponding transcription 150. Note that for purposes of illustration, in the example in FIG. 1, both transcription handling system 105 and model management system 110 are shown to be part of transcription system 100. In some embodiments, model management system 110 may be separate from transcription system 100, such that model management system 110 may be dedicated for developing machine learning models whilst transcription system 100 may be responsible primarily for transcribing audios (as illustrated and discussed with regard to FIG. 2 where a transcription system may be implemented as a transcription service that is separate from a training service). For instance, model management system 100 may provide functionalities for creation of general speech-to-text models, besides custom speech-to-text models for specific domains. In some embodiments, a speech-to-text model may include multiple components (as described below in FIG. 3), and domain-specific speech-to-text model 120 may share one or more components with the other models 115 (e.g., a general speech-to-text model or another domain-specific speech-to-text model). For instance, domain-specific speech-to-text model 120 may include a language model and/or an acoustic model specifically for the legal domain of speech in English, while sharing an identical data preprocessing component and/or feature extraction component with an English-version general speech-to-text model. In some embodiments, model management system 100 may be used to build various machine learning models, e.g., image processing systems, product recommendation systems, besides speech-to-text models.

Figure 2:
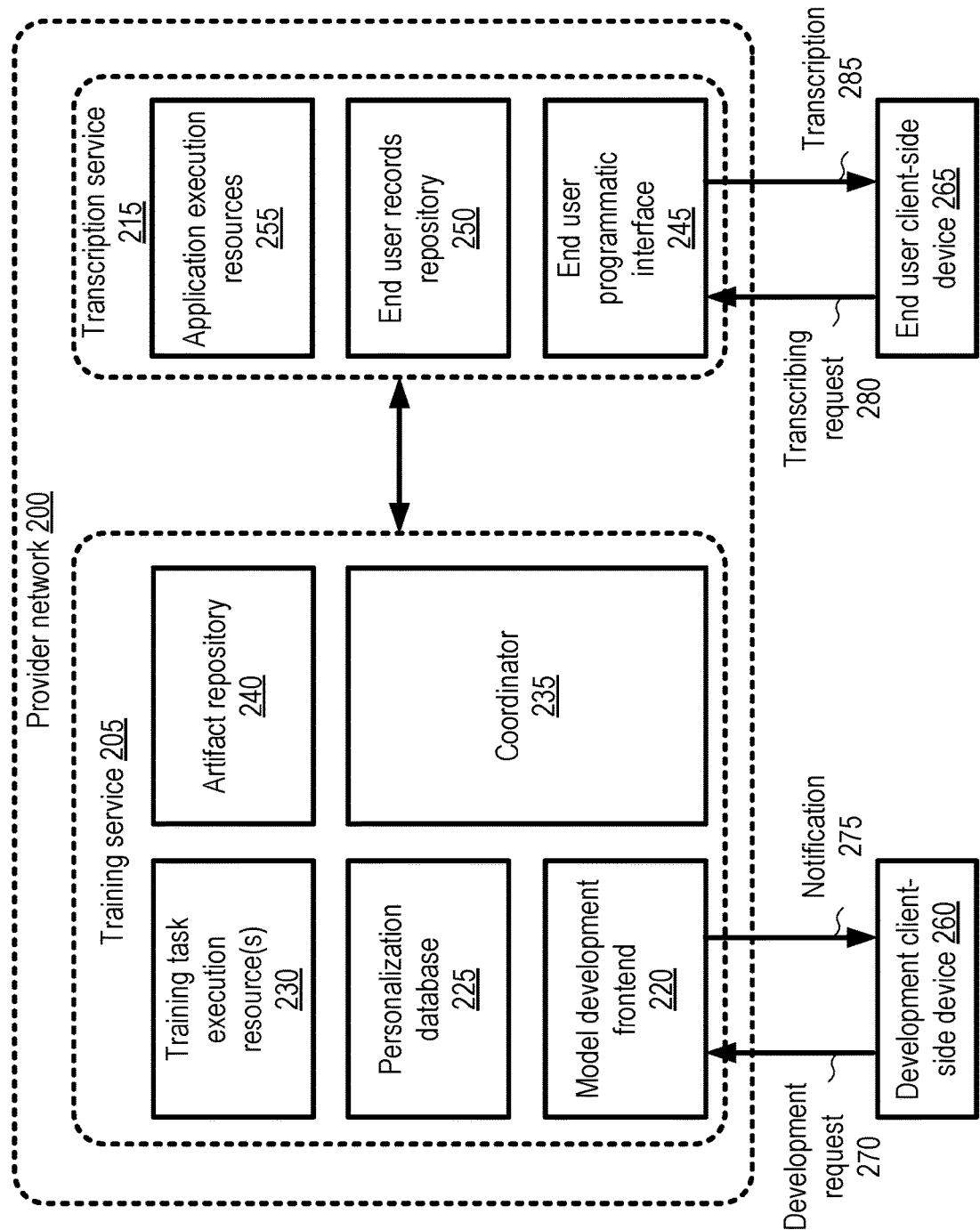
FIG. 2 is a block diagram of example model training and transcription services, according to some embodiments.

FIG. 2 shows a block diagram of example model training and transcription services, according to some embodiments. The model training and transcription services may be implemented based on a transcription system (e.g., transcription system 100) but as online network-accessible services, e.g., offered by a provider network. For instance, the model training and transcription services may be a network-accessible services offered by the provider network, along with various other cloud-bases services including, e.g., remote storage service, remote computing service, remote networking service, remote e-mail service, and/or remote media streaming service, etc. In this example shown in FIG. 2, provider network 200 may include training service 205, and transcription service 215. Training service 205 may interact primarily with a developer, e.g., represented by development client-site device 260, to generate and train a custom speech-to-text model for a specific domain. Transcription service 215 may interact primarily with an end user, e.g., represented by end user client-side device 265, to test the trained custom speech-to-text model for the specific domain. For purposes of illustration, in the example in FIG. 2, model training service 205 and transcription service 215 are shown as two separate services of provider network 200. For instance, model training service 205 may be used for creating and training of various speech-to-text models (including, e.g., general and domain-specific speech-to-text models in various languages and for various specific domains) and/or other machine learning machines (including, e.g., speech-to-text models, image processing models, product recommendation models, etc.), whist transcription service 215 may be primarily responsible for transcribing audios, as described above. In some embodiments, training service 205 and transcription service 215 may be implemented as one single service (e.g., both as part of transcription system 100 in FIG. 1) such that training service 205 may be dedicated for creating and training speech-to-text models for transcription service 205.

As shown in FIG. 2, training service 205 may include model development frontend 220, personalization database 225, and/or training task execution resources 230. In some embodiments, model development frontend 220 may include one or more programmatic interfaces, e.g., a user console, a graphic user interface (GUI), an HTTP/HTTPS endpoint, a command line interface (CLI), etc., which may receive development request 270 from development client-side device 260. In some embodiments, development client-side device 260 may include laptops, desktop computers, and the like. In some embodiments, development client-side device 260 may submit development request 270 with training data and/or associated metadata for creating a custom speech-to-text model for a specific domain, e.g., legal, finance, etc. In some embodiments, instead of providing the training data, development client-side device 260 may identify pre-stored training data from training service 205, e.g., from personalization database 225 or artificial repository 240. In some embodiments, development client-side device 260 may create new training data from the submitted and/or previously stored training data, e.g., by sampling or dividing the submitted and/or previously stored training data into multiple subsets and using some subsets for training and some subsets for testing (e.g., cross validation). In some embodiments, the training data may include audio data (e.g., data in various audio and/or video files) associated with marked-up transcriptions. In some embodiments, the training data submitted may include specific lexicons and/or audio data associated with the specific domain. This may assist operations of training task execution resources 230 to develop the custom speech-to-text model for the specific domain.

In some embodiments, development request 270 may specify a workflow, e.g., written in DSL, and instructions for tasks. For instance, the instructions for the tasks may include code contained in respective task images, and the workflow may be a Python code representing a sequence for performing of tasks to build the custom speech-to-text model. In some embodiments, the sequence may rest on the dependencies between the tasks, e.g., dependencies between individual input and output of the tasks. For instance, when the output of a first task become the input of a second task, the first task may have to be performed before the performance of the second task. In some embodiments, when model development frontend 220 receives development request 270 (specifying e.g., the training data, metadata, workflow and/or instructions), model development frontend 220 may parse development request 270 and store the uploaded data to personalization database 225. For instance, the training data may be stored in a training data section while associated metadata may be saved to the metadata section of personalization database 225. In some embodiments, the developer may configure various settings of personalization database 225. For instance, the developer may decide who has what type of access to what type of data stored in the personalization database, e.g., for security purposes. Herein, the access may include operations such as to read, write, delete and/or update the corresponding data. In another example, development client-side device 260 may decide how long the of data may be stored in personalization database 225. When the time expires, the corresponding data may be removed from personalization database 225 of training service 205. In some embodiments, in response to development request 270, model development frontend 220 may parse the workflow to determine respective schedules for executing the instructions of the tasks. For instance, model development frontend 220 may generate a dependency graph representing the dependencies between the tasks and schedule executions of the corresponding instructions accordingly. Below is pseudocode illustrating an example workflow:

```
T1 = NormalizeData(
    image = normalization_container,
    inputs = {
        corpus = data_store_Corpus_location,
    }
    params = {
        param1 = frequency,
        param2 = language
    },
    outputs = {
        normalized_corpus = data_store_location
    },
    requirements = {
        memory = 10g,
        vcpu = 10,
        gpu = false
    }
)
T2 = FeatureExtraction(
    image = feature_container,
    inputs = {
        corpus = T1.outputs['normalized_corpus']
    },
    params = {
        algo = 'mfcc'
    },
    outputs = {
        features = data_store_location
    },
    requirements = {
        memory = 20g,
        vcpu = 10,
        gpu = false
    }
)
T3 = Training(
    image = training_container,
    inputs = {
        features = T2.outputs['features']
    },
    params = {
        learning_rate = 0.001
    },
    outputs = {
        models = data_store_location
    },
    requirements = {
        memory = 20g,
        vcpu = 10,
        gpu = true
    }
)
```

In various embodiments, model training may involve tasks such as data preprocessing, training, post-training, among others. Each task may further include a set of inputs, parameters and outputs. Moreover, each task may have different computing requirements. For instance, a task may be represented as Task(inputs, params, outputs, computing requirements). As shown in this example above, the workflow may include three tasks T1, T2 and T2, where T1 may correspond to data preprocessing, T2 may perform acoustic feature extraction, and T3 may relate to training. In some embodiments, instructions (e.g., code) for tasks T1, T2 and T3 may be contained in respective task images (e.g., container images which may be an application to be executed on a virtualized operating system (as opposed to a virtualized machine)). This may allow for various tasks to be separately specified in different respective images (e.g., "normalization_container", "feature_container", and "training_container"), and instructions (e.g., code) of the workflow may be contained in a separate task image. In addition, each task T1, T2 and T3 may specify a set of inputs, parameters, and outputs, as well as computing requirements. For instance, T1 may include inputs (e.g., "corpus" retrieved from "data_store_corpus_location"), parameters (e.g., frequency and language), outputs (e.g., "normalized_corpus" to be stored at "data_store_location"), and computing resource requirements (e.g., memory, virtual CPU and graphic GPU). Further, the example workflow may also specify the dependencies between the three tasks T1, T2 and T3, e.g., based at least in part on individual inputs and/or outputs of T1, T2 and T3. For instance, the outputs of T1 (e.g., "normalized_corpus") may become the inputs to T2, while the outputs of T2 (e.g., "features") may become the inputs to T3. Thus, in this example, T1 may have to be performed first, T2 next, and T3 last.

Model development frontend 220 may inform coordinator 235 of development request 270 for creating the custom speech-to-text model. In some embodiments, coordinate 235 may orchestrate the custom speech-to-text model generation and training process. In some embodiments, coordinator 235 may access personalization database 225 and send the instructions and/or the training data to training task execution resources 230 according to the respective schedules. Training task execution resources 230 may execute the instructions to perform the tasks using the training data to generate and train the custom speech-to-text model for the specific domain. For instance, when the instructions are contained in task images, training task execution resources 230 may instantiate respective containers based on the images to run the contained code on a virtualized operating system to perform the respective tasks. In some embodiments, coordinator 235 may pull the instructions and/or training data from personalization database 225 in a batch model. Moreover, in some embodiments, coordinator 235 may automatically determine the scale of the custom speech-to-text model building job based at least in part on, e.g., the volume of training data and/or the number of tasks to be processed, and submit the batch data to training task execution resources 230 accordingly to scale out the tasks. For instance, coordinator 235 may refer to the determined schedules and scale-out plan, determine one batch of tasks, and pull the corresponding instructions and/or training data from personalization database 225 to training task execution resources 230 to perform the corresponding batch of tasks. Until after receiving an indication that this batch of tasks has been performed, coordinator 235 may determine a next batch of tasks with reference to the schedules, pull a next batch of instructions and/or training data for training task execution resources 230 to perform the next batch of tasks.

In some embodiments, transcription service 215 may include a speech-to-text model repository. In some embodiments, the speech-to-text model repository may have access to artifact repository 240. The developer may not necessarily submit a model to training service 205. Instead, development client-side device 260 may specify a model from the speech-to-text model repository, as a template, to generate and train the custom speech-to-text model. In some embodiments, development client-side device 260 may submit a primitive (e.g., untrained) speech-to-text model to training service 205, e.g., through model development frontend 220, and training task execution resources 230 may train the primitive model to generate the final custom speech-to-text model. In some embodiments, the instructions for the tasks may include various parameters and resource requirements for the corresponding task (as described below). Development client-side device 260 may not necessarily specify what exactly resources to be used for building the custom speech-to-text model. Instead, coordinator 235 may identify, reserve and configure the appropriate computing resources. For instance, coordinator 235 may determine the resources based at least in part on the computing requirements specified in each tasks (e.g., tasks T1, T2, and T3 as described above) and provision them as training task execution resources 230. Training task execution resources 230 may execute the instructions to generate and train the custom speech-to-text model. Coordinator 235 may continuously monitoring performance of the tasks and adjust the computing resources accordingly. When more computing resources are needed, coordinator 235 may add more computing resources (e.g., by provisioning more resources from computing resources offered as part of other provider network services, such as virtual computing services). Conversely, when fewer computing resources are needed, coordinator 235 may release more computing resources. This way, the developer may only need to pay for necessary computing resources without overpaying for resources that never get used. In some embodiments, coordinator 235 may provision the computing resources for individual developers in an insulated mode, such that the computing resources for one developer may be isolated from those of another developer. From tenant's standpoint, this may prevent unauthorized developers (e.g., unauthorized tenants) from gaining access to data associated with the speech-to-text model(s) of another developer (e.g., another tenant).

In some embodiments, training task execution resources 230 may store various training-related data to be stored to artifact repository 240. For instance, artifact repository 240 may store various versions of the custom speech-to-text model. In another example, artifact repository 240 may maintain various events or logs associated with training of the custom speech-to-text model. For instance, the various events or logs may include time series of training error(s) for different training parameters, training data, etc. In some embodiments, training system 205 may assign unique identifiers for the various speech-to-text models and training-related data stored in the artifact repository, based on which end users may access these data in a future, as described below. For instance, training service 205 may assign one identifier to a custom speech-to-text model for the legal domain and another identifier to a custom speech-to-text model built for the finance domain. In some embodiments, the developer may configure various settings as to the data stored in artifact repository 240, e.g., for security reasons. For instance, the developer may decide who has what type of access to what type of data stored in artifact repository 240. The access may include operations such as to read, write, delete and/or update the corresponding data. In some embodiments, training task execution resources 230 may create various default and/or customizable notifications 275 (e.g., training progress and/or error alerts) which may be returned to development client-side device 260.

Once the training of the custom speech-to-text model is completed, development client-side device 260 may request transcription service 215 to deploy the trained model (e.g., for production or testing purposes). In some embodiments, training service 215 may automatically determine and provision appropriate computing resources 255 to host the deployed custom speech-to-text model. In another example, the developer may specify needed computing resources and request transcription service 215 to reserve and provision the specified computing resources 255 accordingly. However, in some embodiments, transcription service 215 may implement a fully managed (e.g., serverless) deployment of application execution resources 255 so that to deploy and apply a custom model is performed without user-specified input into the number of computing resources needed or arraignment of computing resources to perform transcriptions with the custom model.

In some embodiments, the developer may deploy the custom speech-to-text model by incorporating it in various applications, e.g., through an API in a dialog application. When end user client-side device 265 uses the applications, an API call may be invoked to submit audio data in a specific domain (e.g., data in various audio and/or video files) 280 to transcription service 215 for conversion using the custom speech-to-text model. In some embodiments, end user client-side device 265 may include voice-directed personal assistants, smart phones, wearable devices, and the like. In some embodiments, a custom speech-to-text model may be identified based at least in part on the identifier assigned to the custom speech-to-text model, which is described above. The custom speech-to-text model may transcribe the audio data and return text transcription 285 to end user client-side device 265.

In some embodiments, the custom speech-to-text model may be deployed as part of network-accessible transcription service 215 of provider network 200. End user client-side device 265 may submit audio data 280 directly to transcription service 215, e.g., through end user programmatic interface 245 (including e.g., a user console, a graphic user interface (GUI), an HTTP/HTTPS endpoint, a command line interface (CLI), and the like). End user client-side device 265 may identify the custom speech-to-text model based at least in part on an identifier associated with this custom speech-to-text model, as described above. The audio data may be applied to the custom speech-to-text model to generate converted transcription 285 for the end user. In some embodiments, transcription service 215 may further provide end user records repository 250 which may store various data associated with individual end users. For instance, end user records repository 250 may maintain the audio data and/or associated transcriptions for a specific end user. The specific end user may also specify the settings for his/her data stored in end user records repository 250 to configure the security and access privileges for the corresponding data stored therein.

In some embodiments, end users may also include the developer him/herself or other end users who may want to access the custom speech-to-text model and/or associated training-related data, e.g., stored in artifact repository 240, after training of the custom model. For instance, a developer may want to access the trained model in artifact repository 240 and perform some further training or improvement to the custom speech-to-text model. In another example, the developer may want to re-use the custom speech-to-text model, e.g., as a template, to develop other custom models. In another example, the developer may want to view the training process to analyze training parameters and/or other training-related information for debugging. In some embodiments, the events or logs stored in artifact repository 240 may be used to create displays for the end users. For instance, the end users may retrieve the training-related information from artifact repository 240 to plot curves to demonstrate various training process associated with the custom speech-to-text model.

As described above, a training system (e.g., training system 125 in FIG. 1) incorporated as part of a transcription system or a separate training service (e.g., training service 205 as discussed above with regard to FIG. 2) may build the custom speech-to-text model based on various artificial intelligence and machine learning models and algorithms (e.g., support vector machines, regular feedforward artificial neural networks, recurrent neural networks such as long short-term memory, convolutional neural networks, self-attentive neural networks, etc.).

Figure 3:
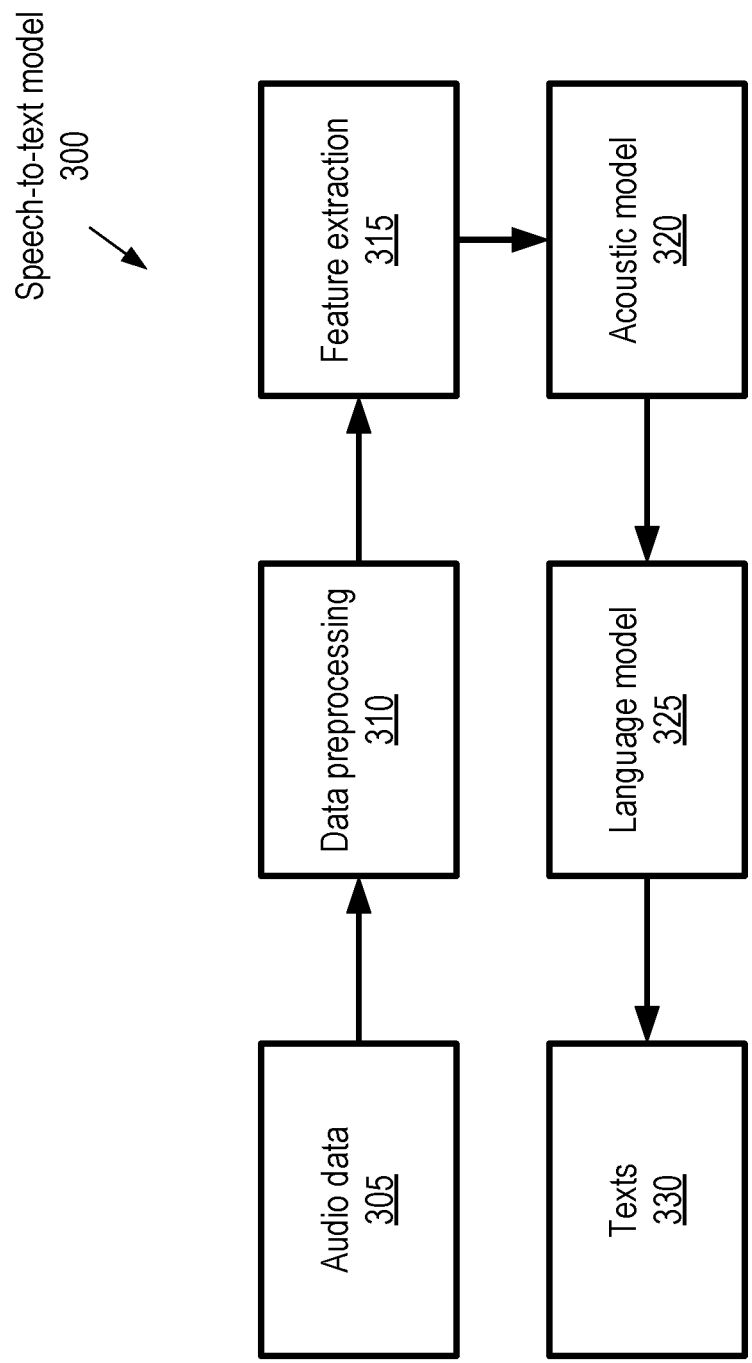
FIG. 3 is a block diagram showing an example speech-to-text model, according to some embodiments.

In some embodiments, the developer may provide a primitive (e.g., untrained) model, and the training system may train the primitive model to generate the custom speech-to-text model for deployment. In some embodiments, the transcription service may include a speech-to-text model repository which may store various trained or untrained speech-to-text models. The developer may select a model from the repository, configure parameters, and request the speech-to-text model to use this model as a template to generate and train the custom speech-to-text model. For purposes of illustration, FIG. 3 shows an example speech-to-text model, according to some embodiments. In this example, speech-to-text model 300 may include data preprocessing component 310, feature extraction component 315, acoustic model 320, and/or language model 325, according to some embodiments. In some embodiments, speech-to-text model 300 may further include a lexicon or pronunciation library (not shown).

Data preprocessing component 310 may take audio data 305 as input and perform various data preprocessing functions to prepare the raw audio data 305 for further analysis. Example data preprocessing in the context of speech recognition may include background and ambient noise removal, voice activity detection or speech word detection, data normalization (e.g., task T1 in the example workflow as described above), etc. Herein, audio data 305 may refer to either a training data set or a testing data set. Either data set may include audio data typically encoded and saved in various audio or video files (e.g., .m4a, .mp4, .wav, .mp3 files). The primary difference between the two is that the training data set may also include a marked-up transcription associated with the audio data. The marked-up transcription may represent anticipated texts for speech-to-text model 300 to produce. In some embodiments, audio data 305 may include one or more metadata associated with the audio data and/or marked-up transcription. For instance, the metadata may indicate the audio data and/or marked-up transcription are in a specific language, e.g., English. In another example, the metadata may specify a particular domain, e.g., legal, finance, etc. In training, speech-to-text model 300 may take audio data 305 as input to produce text transcription 330. Text transcription 330 may be compared versus the anticipated transcript provided in training data set 305 to calculate a loss function. Based on the loss function, speech-to-text model 300 may tune parameters (e.g., through backpropagation-based gradient descent algorithms) of acoustic model 320 and language model 325 to learn the speech-to-text capabilities. In testing, speech-to-text model 300 may be fed with audio data 305 which may not necessarily include an expected transcription. Instead, text transcription 330 produced by speech-to-text model 300 may be used as output to return to the end user.

Feature extraction component 315 may take the preprocessed data from data preprocessing component 310 as input to extract various acoustic features. For instance, feature extraction component 315 may calculate Mel-Frequency cepstral coefficients (MFCC) to create a log-Mel cepstrum of the audio data. In some embodiments, feature extraction component 315 may perform perceptual linear prediction (PLP) or a combination of MFCC and PLP on the audio data. Acoustic model 320 may describe the probabilistic behavior of the encoding of the linguistic information in a speech signal. A function of acoustic model 320 is to generate phone sequences or words based on acoustic signals. Language model 325 may be trained to capture the regularities in the spoken language to estimate the probabilities of word sequences. A function of language model 325 may be to combine the phone sequences or words from acoustic model 320 to create sentence(s). The lexicon or pronunciation library may include a vocabulary of words with pronunciations. For speech-to-text model 300, the lexicon or pronunciation library may include all words known by speech-to-text model 300, where each word has one or more pronunciations with associated probabilities. In some embodiments, the developer may submit a list of words associated with a specific domain for the lexicon or pronunciation library. Furthermore, acoustic model 320 and language model 325 may be trained to focus on recognizing words commonly used in a specific domain.

Figure 4:
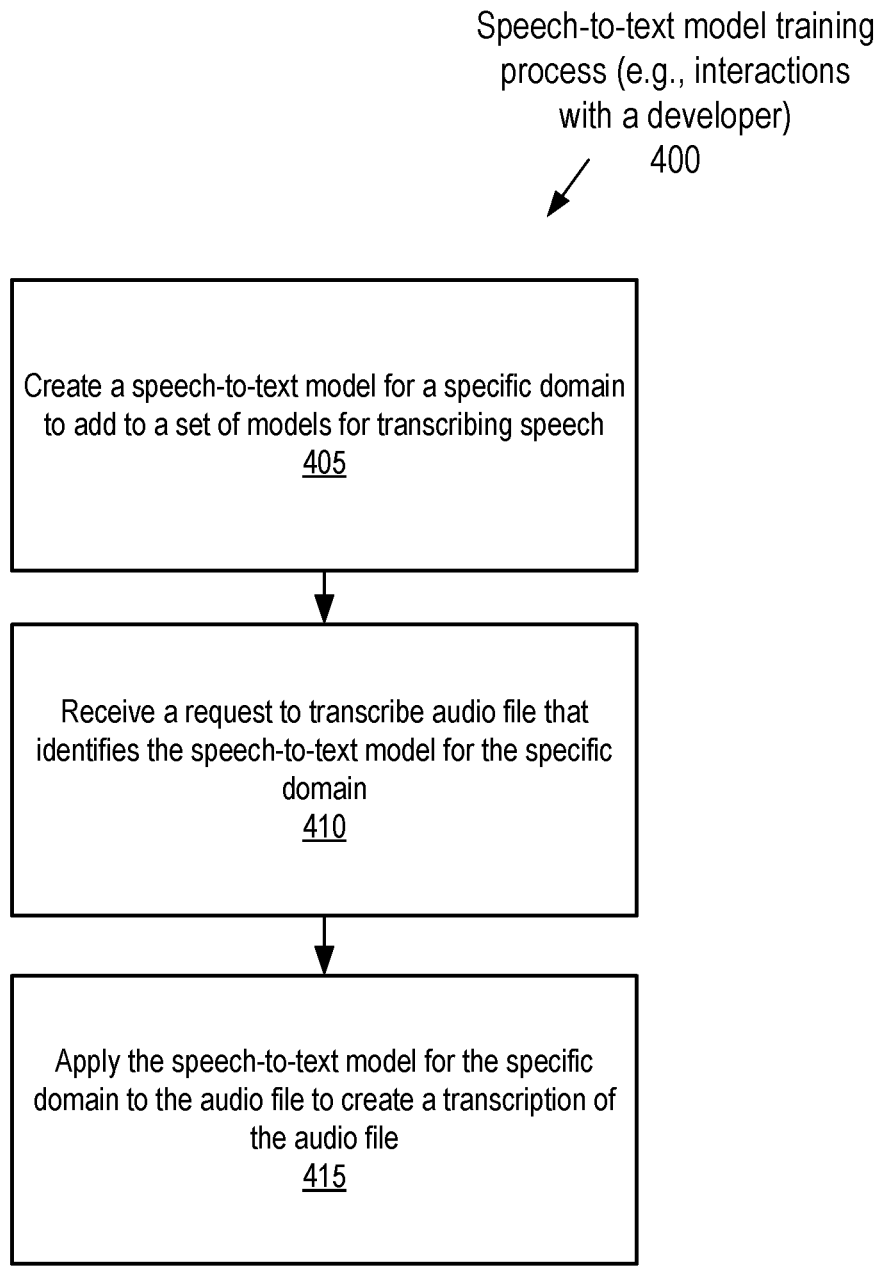
FIG. 4 is a flowchart showing an example process of transcribing audio using a custom speech-to-text model, according to some embodiments.

FIG. 4 shows an example process of transcribing audio using a custom speech-to-text model, according to some embodiments. In this example, process 400 may commence with receiving a request for creating a speech-to-text model for a specific domain of speech to add to a set of one or more speech-to-text models available for transcribing speech in the same language (block 405). As described above, the request may specify a training data set and instructions representing tasks. The training data set and the instructions for the tasks may be obtained from a developer (e.g., development client-side device 260 in FIG. 2) by a transcription service (e.g., transcription service 200 in FIG. 2) or other service that uses speech-to-text models. In some embodiments, the developer may submit the training data set and instructions to the speech-to-text service through a programmatic interface. In some embodiments, the developer may include a workflow, e.g., written in DSL, to specify the dependencies between the tasks.

As described above, each task may include a set of inputs, parameters, outputs, and computing resources. In some embodiments, the workflow may include information specifying the set of inputs, parameters, outputs, and computing resources for each task. The developer may place the instructions corresponding to each task, e.g., in a task image. In some embodiments, the training data may be associated with a specific domain. For instance, the training data may include vocabulary and/or pronunciations for words commonly used in the specific domain. In some embodiments, the transcription service may parse the submitted information from the developer to determine respective schedules for executing the instructions based at least in part on the dependencies between the tasks. As described above, the model development frontend (e.g., model development frontend 220 in FIG. 2) may parse the workflow and determine a dependency graph representing a sequence to perform the tasks. As described above, an example workflow may include three tasks T1, T2 and T3 respectively for data preprocessing, feature extraction and training. The dependencies between tasks T1, T2 and T3 may be determined base at least in part on the individual inputs and outputs of tasks T1, T2 and T3. As shown by the example flowchart described above, instructions for task T1 may be executed first, instructions for task T2 next, and instructions for task T3 last.

In some embodiments, a training system or service may execute the instructions according to their respective schedules to training a speech-to-text model for the specific domain using the training data. As described above, a service may use an internal training system or a separately implement training system (e.g., training task execution resources 230 of training service 205 in FIG. 2) to generate and train the speech-to-text model for the specific domain with the training data. As described, in some embodiments, the developer may provide a primitive (untrained) custom speech-to-text model, and the training system may train the primitive model to generate the final trained custom speech-to-text model for deployment.

In some embodiments, the service may include a speech-to-text model repository which may store various trained or untrained speech-to-text models. The developer may select a model from the repository, configure the parameters and request the speech-to-text model to use the identified model as a template to generate the train the custom speech-to-text model. In addition, as described, training process 300 may be performed under the control of a coordinator of the transcription service (e.g., coordinator 235 in FIG. 2). The coordinator may automatically scale out the tasks and fetch the tasks to the training system in a batch mode. For instance, the coordinator may refer to the determined schedules and pull the instructions and/or training data for one batch of tasks to the training system. Until after the batch of tasks is completed, the coordinator may pull a next batch of tasks for the training system to execute.

As described above, the training system may create various notifications (e.g., notification 275 in FIG. 2) associated with training of the custom speech-to-text model for the developer, according to some embodiments. Further, in some embodiments, the transcription service may store various versions of the custom speech-to-text model and/or other training-related data in an artifact repository (e.g., artifact repository 240 in FIG. 2). In some embodiments, the transcription service may assign unique identifiers to the various versions of the custom speech-to-text model and/or training-related data. As described above, the developer may configure various security-related settings to specify the access to the data stored in the artifact repository.

Referring back to FIG. 4, as described above, once trained, the developer may request the transcription service to deploy the trained custom speech-to-text model. For instance, the speech-to-text model may be deployed through an API incorporated in various application, e.g., a dialog-driven application. In another example, the speech-to-text model may be deployed as part of a network-accessible service of a provider network. In some embodiments, the transcription service may receive a request to convert audio data in a specific domain to texts (block 410). As describe above, the request may be received through an API call or a programmatic interface (e.g., end user programmatic interface 245 in FIG. 2) directly from an end user. The request may identify the speech-to-text model based at least in part an identifier assigned to the speech-to-text model by the transcription service. In response, the transcription service may identify the trained speech-to-text model for the specific domain, e.g., from the artifact repository, based at least in part on the identifier, and apply the audio data to the speech-to-text model to generate the text transcription (block 415). As described above, the speech-to-text service may further store the audio data and converted texts in an end user records repository (e.g., end user records repository 250 in FIG. 2). Further, the end user may configure various security-related settings for accessing the data stored in the end user records repository.

Figure 5:
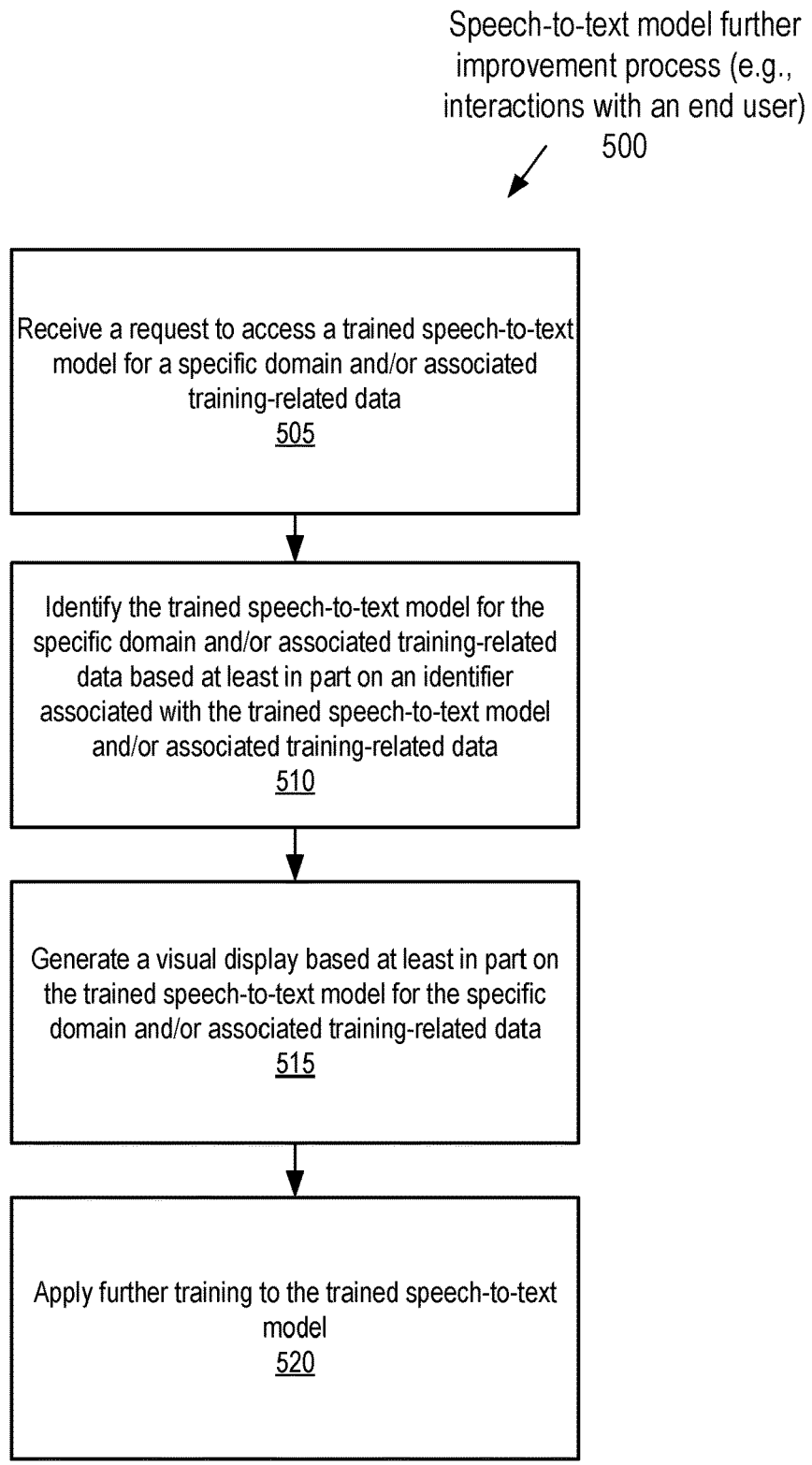
FIG. 5 is a flowchart showing an example process of continuously improving a trained custom speech-to-text model, according to some embodiments.

FIG. 5 shows an example process of continuously improving a trained custom speech-to-text model, according to some embodiments. As described above, end users may include the developer him/herself or other end user who may want to access the speech-to-text model and/or associated training-related data, e.g., stored in an artifact repository (e.g., artifact repository 240 in FIG. 2), e.g., after training of the custom model. For instance, such end users may want to re-use the speech-to-text model to perform further training or improvement. In another example, such end users may want to access the training-related data for debugging or some other analysis.

Process 500 may start with receiving a request to access a trained speech-to-text model for a specific domain and/or training-related data associated with the trained speech-to-text model (block 505). In some embodiments, the transcription service (e.g., transcription service 200 in FIG. 2) may identify the trained speech-to-text model for the specific domain and/or associated training-related data, e.g., from the artifact repository, based at least in part on an identifier associated with the model and/or associated training-related data (block 510). In some embodiments, the transcription service may generate a visual display based at least in part on the trained speech-to-text model for the specific domain and/or associated training-related data (block 515). For instance, the transcription service may plot training convergence curves based on data retrieved from the artifact repository. In some embodiments, the visual displays may be used for debugging or other model analytic purposes. In some embodiments, the transcription service may apply further training to the trained speech-to-text model (block 520). For instance, the transcription service may apply further adjustment to parameters of the trained speech-to-text model, e.g., based on newly connected training data. One with ordinary skills in the art will understand that the embodiments in FIGS. 1-5 are for purposes of illustrations only. The disclosed systems, methods and techniques can be implemented and applied in numerous ways in various speech recognition systems.

Figure 6:
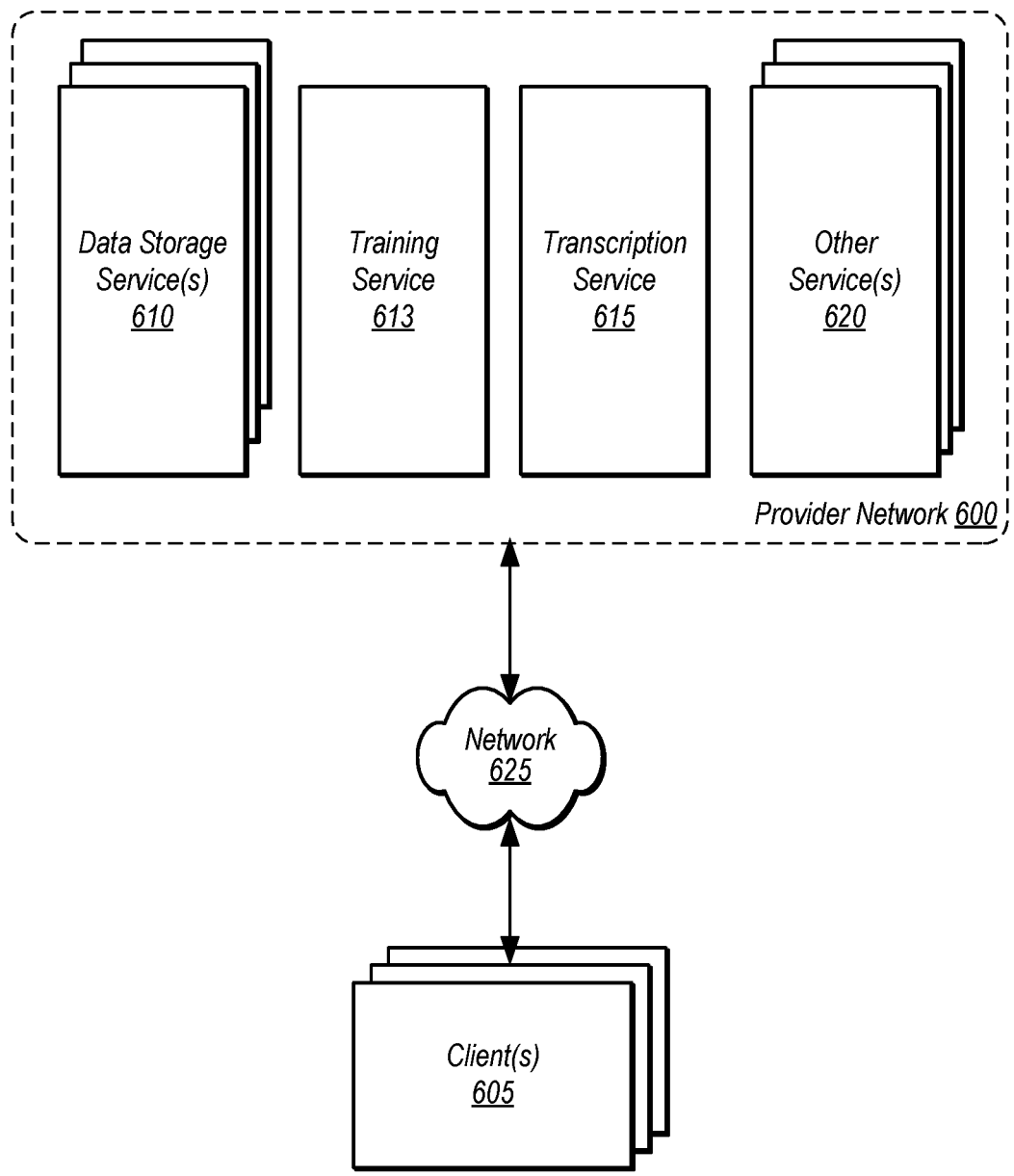
FIG. 6 is a block diagram showing an example provider network for providing model creation & training and audio transcription as network-accessible services, according to some embodiments.

FIG. 6 is a block diagram showing an example provider network for providing models creation, training and audio transcription as network-accessible services, according to some embodiments. In FIG. 6, provider network 600 may be a private or closed system or may be set up by an entity such as a company or a public sector organization to provide one or more services (such as various types of cloud-based storage) accessible via the Internet and/or other networks to one or more client(s) 605. Provider network 600 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 600. In some embodiments, provider network 600 may implement various computing resources or services, such as a data storage service(s) 610 (e.g., object storage services, block-based storage services, or data warehouse storage services), training service 613, transcription service 615, as well as other service(s) 620, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 610 may implement different types of data stores for storing, accessing, and managing data on behalf of client(s) 605 as a network-based service that enables one or more client(s) 605 to operate a data storage system in a cloud or network computing environment. For example, data storage service(s) 610 may include various types of database storage services (both relational and non-relational) or data warehouses for storing, querying, and updating data. Such services may be enterprise-class database systems that are scalable and extensible. Queries may be directed to a database or data warehouse in data storage service(s) 610 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 610 may also include various kinds of object or file data stores for putting, updating, and getting data objects or files, which may include data files of unknown file type. Such data storage service(s) 610 may be accessed via programmatic interfaces (e.g., APIs) or graphical user interfaces. Data storage service(s) 610 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, training service 613 and transcription service 615 may be provided by provider network 600 as network-accessible services for developers to build and deploy custom speech-to-text models for specific domains. As described above, client(s) 605 (e.g., a developer) may submit a model training request with training data and instructions for a series of tasks to training service 613, e.g., through network 625, for creating a custom speech-to-text model for a specific domain. In some embodiments, training service 613 may determine respective schedules for performing the series of tasks and execute the corresponding instructions according to the schedules to generate and train the custom speech-to-text model using the training data. In some embodiments, client(s) 605 (e.g., a developer) may cause provider network 600 to deploy the trained custom speech-to-text model, as part of a network-accessible service. Client(s) 605 (e.g., an end user) may access the deployed custom model, through transcription service 615 via network 625, to request transcription of audio into texts. In some embodiments, transcription service 615 may identify the custom speech-to-text model based on an identifier specified by client(s) 605 and associated with the custom model. Transcription service 615 may apply the custom speech-to-text model to audio data from client(s) 605 to create the corresponding transcription. In some embodiments, training service 613 may store various data and/or metadata associated with the custom speech-to-text model for client(s) 605 (including both developers and end users) in one or more storage resources of training service 613 or data storage service(s) 610 of provider network 600. For instance, provider network 600 may store the submitted training data and/or metadata in a dedicated database (e.g., personalization database 225 in FIG. 2) for a developer, various version of the custom model and/or other training-related events and logs in an artifact repository, and submitted audio data and/or associated transcriptions in end user records repository for an end user. For purposes of illustration, in the example in FIG. 6, training service 613 and transcription service 615 are shown as two separate services of provider network 600. For instance, training service 613 may be used for creating and training of various speech-to-text models (including, e.g., general and domain-specific speech-to-text models in various languages and for various specific domains) and/or other machine learning machines (including, e.g., speech-to-text models, image processing models, product recommendation models, etc.), whist transcription service 615 may be primarily responsible for transcribing audios, as described above. As described above, in some embodiments, training service 613 and transcription service 615 may be implemented as one single service (e.g., both as part of transcription system 100 in FIG. 1) such that training service 613 may be dedicated for creating and training speech-to-text models for transcription service 615.

Other service(s) 620 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 610. Various other distributed processing architectures and techniques may be implemented by data processing services (e.g., grid computing, sharding, distributed hashing, etc.). Note that in some embodiments, data processing operations may be implemented as part of data storage service(s) 610 (e.g., query engines processing requests for specified data).

Generally speaking, client(s) 605 may encompass any type of client configurable to submit network-based requests to provider network 600 via network 625, including requests for storage services (e.g., a request to create, read, write, obtain, or modify data in data storage service(s) 610, a request to build a custom speech-to-text model for a specific domain at transcription service 615, etc.). For example, a given client 605 may include a suitable version of a web browser, or may include a plug-in module or other type of code module configured to execute as an extension to or within an execution environment provided by a web browser. Alternatively, a client 605 may encompass an application such as a database application (or user interface thereof), a media application, an office application or any other application that may make use of storage resources in data storage service(s) 610 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 605 may be an application configured to interact directly with provider network 600. In some embodiments, client(s) 605 may be configured to generate network-based services requests according to a Representational State Transfer (REST)-style network-based services architecture, a document- or message-based network-based services architecture, or another suitable network-based services architecture.

In various embodiments, network 625 may encompass any suitable combination of networking hardware and protocols necessary to establish network-based-based communications between client(s) 605 and provider network 600. For example, network 625 may generally encompass the various telecommunications networks and service providers that collectively implement the Internet. Network 625 may also include private networks such as local area networks (LANs) or wide area networks (WANs) as well as public or private wireless networks. For example, both a given client 605 and provider network 600 may be respectively provisioned within enterprises having their own internal networks. In such an embodiment, network 625 may include the hardware (e.g., modems, routers, switches, load balancers, proxy servers, etc.) and software (e.g., protocol stacks, accounting software, firewall/security software, etc.) necessary to establish a networking link between given client 605 and the Internet as well as between the Internet and provider network 600. It is noted that in some embodiments, client(s) 605 may communicate with provider network 600 using a private network rather than the public Internet.

Figure 7:
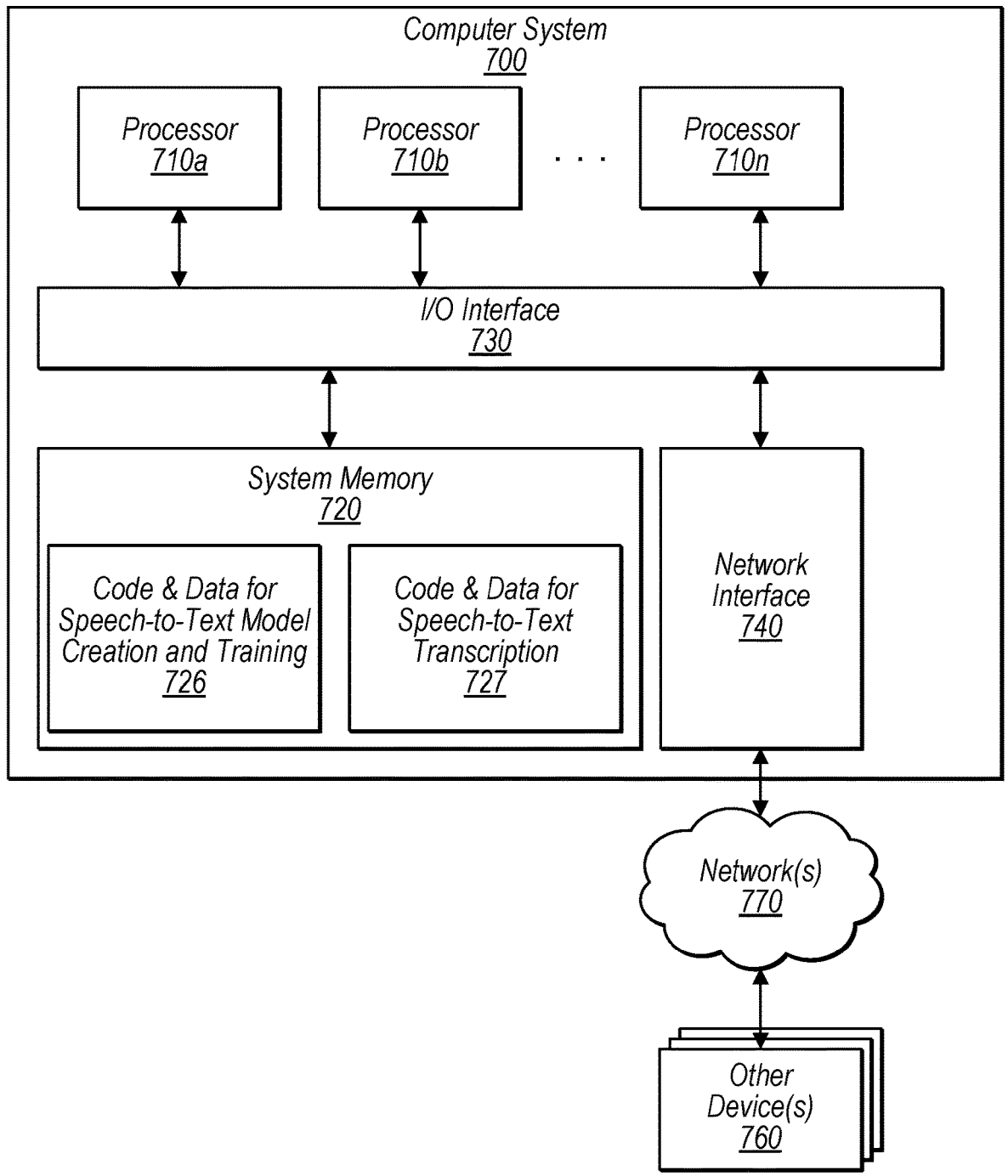
FIG. 7 is a block diagram showing an example computing system to implement the various techniques described herein, according to some embodiments.

FIG. 7 shows an example computing system to implement the various techniques described herein, according to some embodiments. For example, in one embodiment, transcription service 200 may be implemented by a computer system, for instance, a computer system as in FIG. 7 that includes one or more processors executing program instructions stored on a computer-readable storage medium coupled to the processors. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x76, PowerPC, SPARC, or MIPS ISAs, or any other suitable ISA. In multiprocessor systems, each of processors 710 may commonly, but not necessarily, implement the same ISA.

System memory 720 may be one embodiment of a computer-accessible medium configured to store instructions and data accessible by processor(s) 710. In various embodiments, system memory 720 may be implemented using any non-transitory storage media or memory media, such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740. In the illustrated embodiment, program instructions (e.g., code) and data implementing one or more desired functions, as described above in FIGS. 1-6, are shown stored within system memory 730 as code & data for speech-to-text model creation and training 726 and code & data for speech-to-text transcription 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fiber Channel SANs, or via any other suitable type of network and/or protocol.

In some embodiments, system memory 720 may be one embodiment of a computer-accessible medium configured to store program instructions and data as described above for FIG. 1-xx. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices implementing a network-accessible transcription service of a provider network, wherein to implement the transcription service, the computing devices are configured to:
receive, via a network-accessible interface, a request that specifies a domain of speech and requires to generate a speech-to-text model for the specified domain to be used for transcribing audio data associated with the specified domain;
in response to the request, train a speech-to-text model according to a workflow of tasks and a training data set corresponding to the specified domain to generate a trained speech-to-text model for the specified domain;
receive, via the network-accessible interface, a transcription request to transcribe particular audio data of the specified domain of speech;
identify the trained speech-to-text model for the specified domain of speech instead of a general speech-to-text model to transcribe the particular audio data; and
create a transcription of the particular audio data using the trained speech-to-text model for the specified domain.

2. The system of claim 1, wherein to generate the trained speech-to-text model for the specified domain, the computing devices are configured to:
determine respective schedules for executing instructions for the tasks based at least in part on the workflow; and
execute the instructions according to the respective schedules to train the speech-to-text model using the training data set to generate the trained speech-to-text model for the specified domain.

3. The system of claim 1, wherein the workflow represents dependencies between the tasks based at least in part on individual input and output of the tasks.

4. The system of claim 1, wherein the trained speech-to-text model is stored in one or more data stores that are implemented as part of the transcription service or a data storage service offered by the provider network.

5. A method, comprising:
creating a speech-to-text model for a specific domain of speech, in response to a first request received via an interface of a transcription service of a provider network that is implemented using one or more computing devices, to be added to a set of one or more speech-to-text models available for transcribing speech, wherein the first request specifies the specific domain of speech and requires the creation of the speech-to-text model for the specific domain;
receiving, via the interface, a second request to transcribe an audio file that identifies the speech-to-text model for the specific domain of speech; and
responsive to the second request, selecting the speech-to-text model for the specific domain of speech from the set of speech-to-text models to transcribe the audio file to create a transcription of the audio file.

6. The method of claim 5, wherein creating the speech-to-text model for the specific domain of speech comprises:
determining respective schedules for executing a plurality of instructions for a plurality of tasks based at least in part on dependencies between the plurality of tasks; and
executing the plurality of instructions according to the respective schedules to train a speech-to-text model using a training data set to create the speech-to-text model for the specific domain.

7. The method of claim 6, wherein the dependencies between the plurality of tasks include dependencies between individual input and output of the plurality of tasks.

8. The method of claim 6, wherein executing the plurality of instructions comprises:
obtaining one batch of the plurality of instructions until after execution of another batch of the plurality of instructions; and
executing the batch of the plurality of instructions.

9. The method of claim 6, wherein executing the plurality of instructions comprises:
provisioning one or more computing resources for respective ones of the plurality of instructions; and
executing the respective ones of the plurality of instructions using the provisioned one or more computing resources.

10. The method of claim 5, wherein creating the speech-to-text model for the specific domain of speech comprises generating one or more logs associated with training of the speech-to-text model.

11. The method of claim 10, further comprising:
in response to a request, generating a visual display based at least in part on the one or more logs associated with training of the speech-to-text model.

12. The method of claim 5, wherein the speech-to-text model for the specific domain is stored in one or more data stores that are implemented as part of the transcription service or a data storage service offered by the provider network.

13. One or more non-transitory, computer readable media, storing program instructions that when executed on or across one or more computing devices, cause the one or more computing devices to implement:
creating a speech-to-text model for a specific domain of speech, in response to a first request received via an interface of a transcription service of a provider network that is implemented using one or more computing devices, to be added to a set of one or more speech-to-text models available for transcribing speech, wherein the first request specifies the specific domain of speech and requires the creation of the speech-to-text model for the specific domain;
receiving, via the interface, a second request to transcribe an audio file that identifies the speech-to-text model for the specific domain of speech; and
responsive to the second request, selecting the speech-to-text model for the specific domain of speech from the set of speech-to-text models to transcribe the audio file to create a transcription of the audio file.

14. The one or more non-transitory, computer readable media of claim 13, wherein, in creating the speech-to-text model for the specific domain of speech, the program instructions cause the one or more computing devices to implement:
   determining respective schedules for executing a plurality of instructions for a plurality of tasks based at least in part on dependencies between the plurality of tasks; and
   executing the plurality of instructions according to the respective schedules to train a speech-to-text model using a training data set to create the speech-to-text model for the specific domain.

15. The one or more non-transitory, computer readable media of claim 14, wherein the dependencies between the plurality of tasks include dependencies between individual input and output of the plurality of tasks.

16. The one or more non-transitory, computer readable media of claim 14, wherein, in executing the plurality of instructions, the program instructions cause the one or more computing devices to implement:
   obtaining one batch of the plurality of instructions until after execution of another batch of the plurality of instructions; and
   executing the batch of the plurality of instructions.

17. The one or more non-transitory, computer readable media of claim 14, wherein the plurality of instructions comprise code in respective container images corresponding to the plurality of instructions.

18. The one or more non-transitory, computer readable media of claim 13, wherein, in creating the speech-to-text model for the specific domain of speech, the program instructions cause the one or more computing devices to implement generating one or more logs associated with training of the speech-to-text model.

19. The one or more non-transitory, computer readable media of claim 16, storing further program instructions that when executed on or across the one or more computing devices, cause the one or more computing devices to further implement:
   in response to a request, generating a visual display based at least in part on the one or more logs associated with training of the speech-to-text model.

20. The one or more non-transitory, computer readable media of claim 13, wherein the speech-to-text model for the specific domain is stored in one or more data stores that are implemented as part of the transcription service or a data storage service offered by the provider network.

* * * * *